United States Patent
Izquierdo Mendoza et al.

(10) Patent No.: US 8,675,803 B2
(45) Date of Patent: Mar. 18, 2014

(54) COVER DEVICE FOR JET PUMPS INSTALLED IN NUCLEAR POWER PLANT VESSELS

(75) Inventors: José Antonio Izquierdo Mendoza, Madrid (ES); Miguel Marti Gomez, Madrid (ES); Carlos Cantos Tejedor, Madrid (ES); Angel Argilés, Madrid (ES); Francisco Pomares Martinez, Madrid (ES); José Vilanova, Madrid (ES); Alberto Vidondo Gil, Madrid (ES); José Tomé De La Concepción, Madrid (ES); Carlos Gavilan Moreno, Madrid (ES)

(73) Assignee: Iberdrola, S.A, Madrid (ES)

( * ) Notice: Subject to any disclaimer, the term of this patent is extended or adjusted under 35 U.S.C. 154(b) by 679 days.

(21) Appl. No.: 12/937,105

(22) PCT Filed: Apr. 9, 2008

(86) PCT No.: PCT/ES2008/070067
§ 371 (c)(1),
(2), (4) Date: Dec. 23, 2010

(87) PCT Pub. No.: WO2009/125028
PCT Pub. Date: Oct. 15, 2009

(65) Prior Publication Data
US 2011/0110476 A1    May 12, 2011

(51) Int. Cl.
*G21C 13/00* (2006.01)

(52) U.S. Cl.
USPC .......................................... 376/204; 376/206

(58) Field of Classification Search
USPC .................................................. 376/204, 206
See application file for complete search history.

(56) References Cited

U.S. PATENT DOCUMENTS

| 4,043,705 | A |   | 8/1977 | Schlosser |
| 4,468,172 | A | * | 8/1984 | Dixon et al. ................. 417/151 |
| 4,548,783 | A |   | 10/1985 | Dalke et al. |

FOREIGN PATENT DOCUMENTS

| ES | 8407618 A1 | 3/1984 |
| ES | 8503159 A1 | 5/1985 |
| JP | 56-151300 A | 11/1981 |
| JP | 10-148691 A | 6/1998 |

* cited by examiner

*Primary Examiner* — Timothy A Brainard
(74) *Attorney, Agent, or Firm* — Brown & Michaels, PC

(57) ABSTRACT

The invention relates to a plug device for jet pumps installed in nuclear power plant vessels, which comprises two covers (1-2) that form two independent plug units, one fitted on the even pump, which incorporates two plugs (6), and the other on the odd pump of each jet pump assembly, which incorporates three plugs (6), both mounted on a common base (3) at the end of respective arms (4), articulated in the central area, which are actuated by mechanical or hydropneumatic means. The plugs may be blind, in which case they are used to seal the five outlets of the nozzle of the jet pump, or channeled, being used to close the decontamination circuit of the recirculation loops, preventing the cleaning solution from being dispersed in the reactor.

4 Claims, 4 Drawing Sheets

COVER DEVICE FOR JET PUMPS INSTALLED IN NUCLEAR POWER PLANT VESSELS

OBJECT OF THE INVENTION

The present invention relates to the nuclear sector, and more specifically to the area of BWR (Boiling Water Reactor) technology vessels. These plugs are used in the decontamination tasks of recirculation loops (channeled plugs) and in maintenance tasks on the valves of the recirculation loops (blind plugs).

The blind plugs of jet pumps are used to seal the five outlets of the nozzle of the jet pump such that the recirculation loop can be isolated from the reactor during the maintenance tasks on the discharge valves of the manual or automatic recirculation pump. The channeled plugs are used to close the decontamination circuit of the recirculation loops, preventing the cleaning solution from being dispersed in the reactor. In other words, they establish the closed circuit.

BACKGROUND OF THE INVENTION

There are currently plugs marketed by other companies to perform both functions, channeling and plugging, but with different drawbacks that are resolved by these plugs.

Firstly, the equivalent pitch diameter of plugs marketed up until now is ¼" (13.7 mm.) whereas those herein developed have a pitch diameter of 1" (33 mm.)

The marketed plugs are mounted in several sub-assemblies, whereas the device of the invention is a single part, i.e., in a single assembly.

DESCRIPTION OF THE INVENTION

This device includes two covers carrying plugs, such that one of them serves to plug the even nozzles, whereas the other one closes the odd nozzles of each jet pump. The combination of both plug units (blind and channeled) allows adjusting the flow rate values in decontamination, such that the flow and head losses are forced by determined jet pumps and prevented by others.

Each of these covers is mounted on a common base and at the end of respective arms articulated in the central area, which are actuated by mechanical or pneumatic means. The installation is carried out by applying the corresponding plug on the nozzles of the jet pump, once the base of the plug is supported on the mixer part of the jet pump through a guide which allows centering the plug device therein. The device is also supported in the jet pump in respective reactions, a lower reaction serving as a support both when introducing the plug in the pump and when demounting same, and another upper reaction serving to allow the closure of the plug against the nozzles of the jet pump, which are located on the plug.

Each of the covers carrying plugs is mounted in the corresponding arm in a pivoting manner on a central point, which allows the self-alignment of the plane of the plugs with the plane of the nozzles to be blocked. The placement of an adjusting screw between the arm supporting each cover and the support guide of the base at the opening of the mixer of the jet pump has also been provided, which adjusting screw allows assuring the parallelism of the sealing surface of the plug with the plane of the nozzles to be plugged of the jet pump.

The covers carrying plugs are optionally attached or are a single cover, incorporating in this case the five plugs in a suitable arrangement and are actuated by means of a single arm and clamping screw.

Furthermore, two models referred to as a blind plug and a channeled plug have been developed in the inventive unit of this device. The use of each of them is described below:

The blind plug only serves to seal the five nozzles of the jet pump.

The channeled plug enables fluid circulation during the decontamination tasks with a section equivalent to 32 mm. To do so it seals the three odd nozzles of the jet pump, while at the same time it conducts the two remaining nozzles to a flow outlet.

DESCRIPTION OF THE DRAWINGS

To complement the description that is being made and for the purpose of aiding the understanding of the features of the invention, a set of drawings is attached to the present specification in which the following has been depicted with an illustrative and non-limiting character.

PREFERRED EMBODIMENT OF THE INVENTION

As can be seen in the mentioned figures, this device includes five plugs (6) mounted in a suitable arrangement to close the five outlets of the nozzle of the jet pump in order to allow isolating the recirculation loop from the reactor during the maintenance tasks in the discharge valves of the recirculation pump. As can be seen in the figures, the plugs (6) are mounted with the following arrangement: two plugs on cover (1) and three on cover (2), in all cases the three plugs located on cover (2) are blind, whereas the two plugs located on cover (1) in the example shown in FIGS. 1 and 2 are blind, but in the example shown in FIGS. 3 and 4 they are channeled, as will be explained below.

Figure 1:
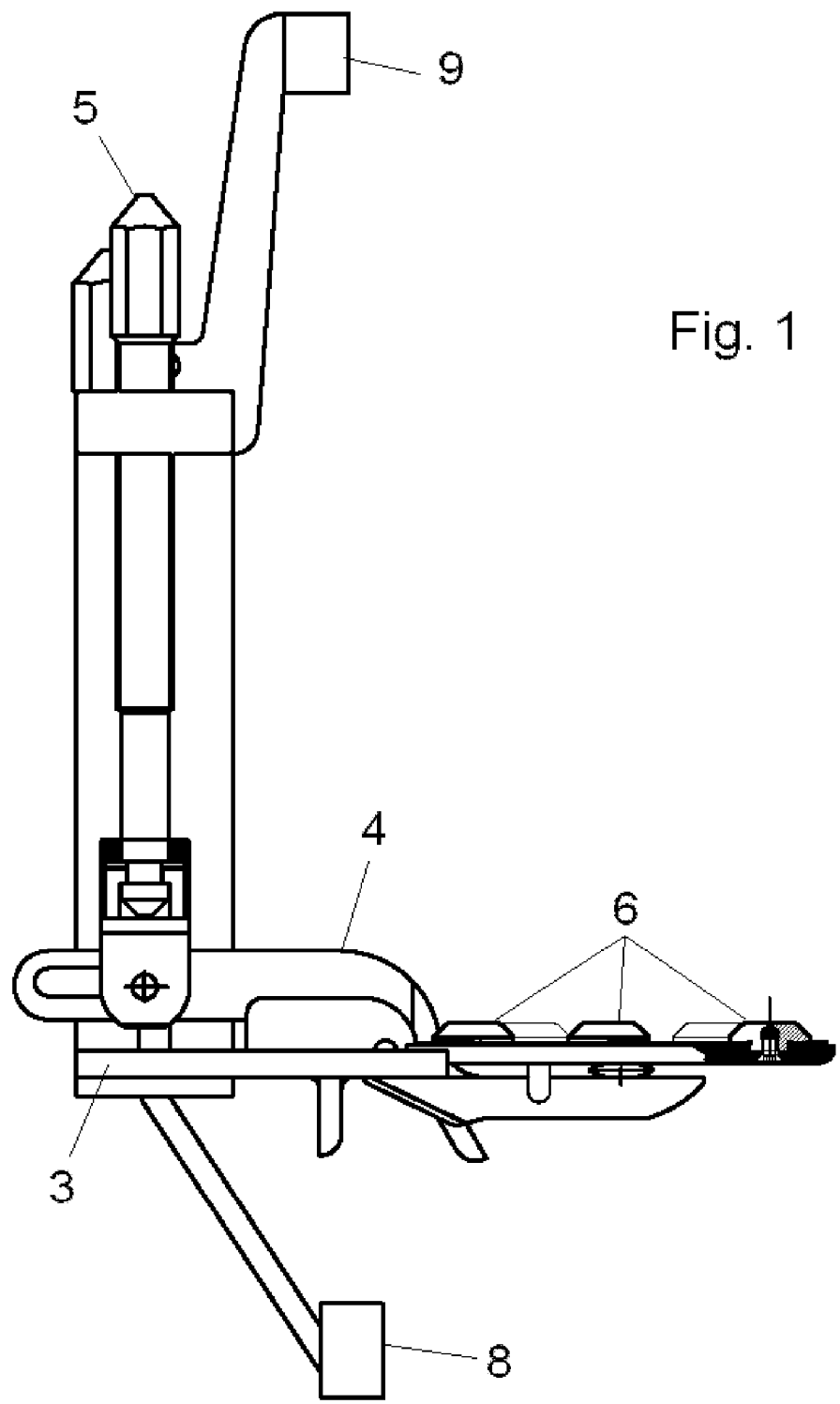
FIG. 1 depicts a side elevational view of a blind plug device.
Figure 2:
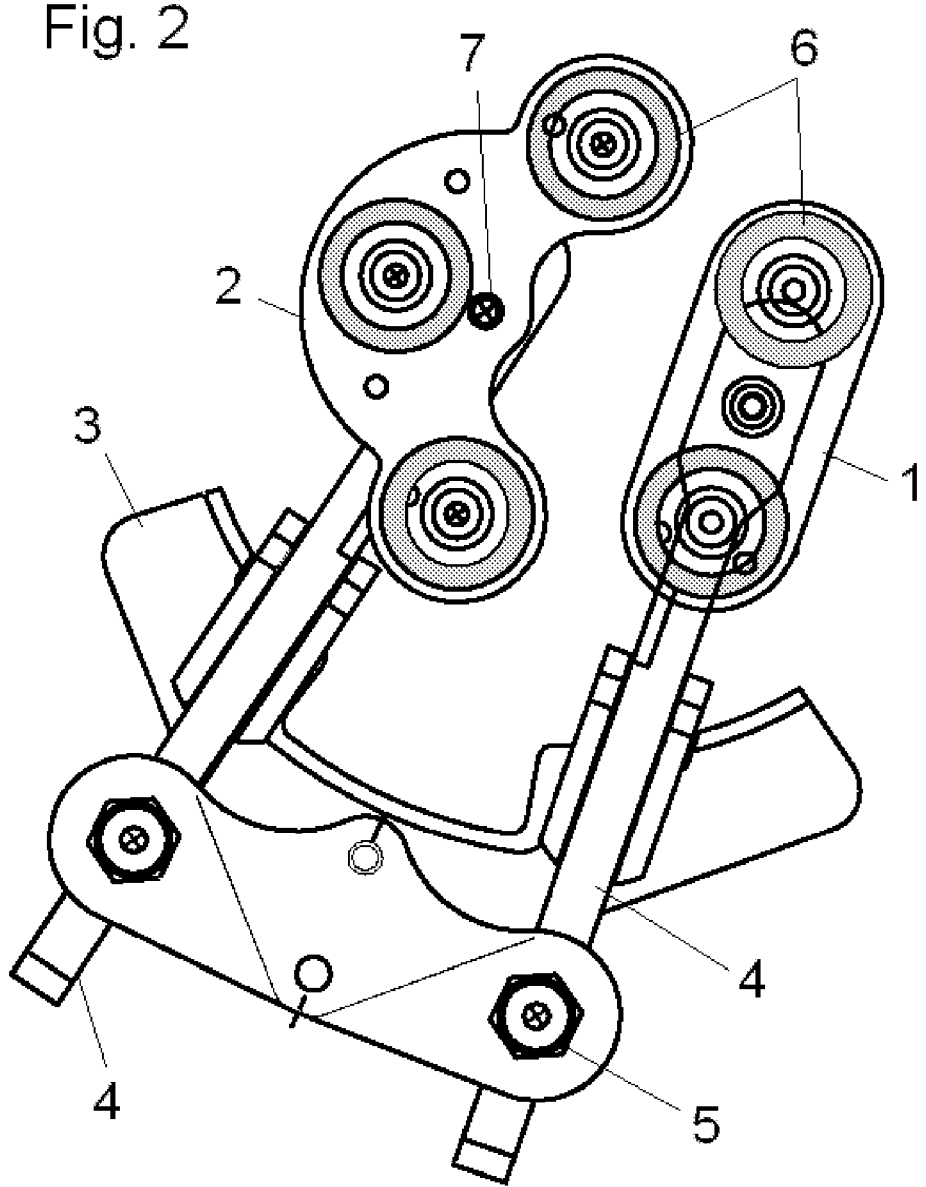
FIG. 2 corresponds to a top plan view of the same aforementioned plug.
Figure 3:
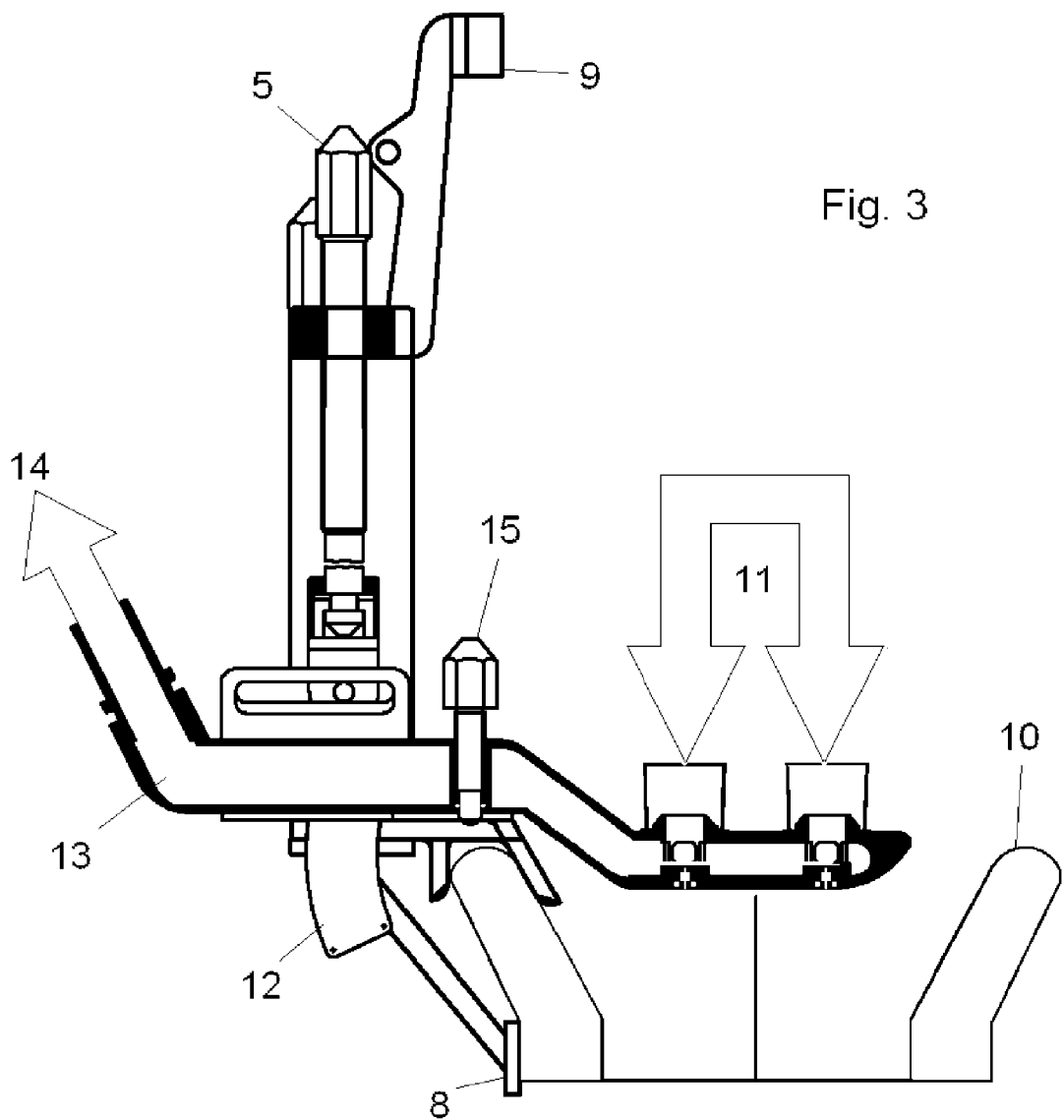
FIGS. 3 and 4 respectively show a partially sectioned elevational view and a plan view of a channeled plug.

Each cover (1-2) is mounted at the end of an arm (4) articulated in a common base (3) and actuated from a screw (5), such that starting from a position in which both covers are dropped downwards, the latter are introduced in the jet pump under the five outlets of the nozzle and are actuated until being placed in the horizontal position depicted in FIGS. 1 and 3, in which all the outlets would be blocked. The base (3) of the device is supported on the mixer part of the jet pump (10), the guide (12) being the part that centers the plug device in two phases, a first approximation phase and another more precise phase performed with the adjusting screw (15) which serves to assure the parallelism of the sealing surface of the plug with the plane of the nozzles to be plugged of the jet pump.

The pivoting mounting of the covers (1-2) in the arms (4) at an intermediate point (7) allows the self-alignment of the plane of the plugs (6) with the plane of the nozzles to be blocked.

The lower reaction (8) serves as support both when introducing the plug in the pump and when demounting same.

The upper reaction (9) serves to allow the closure of the plug against the nozzles of the jet pump which are located on the plug.

The device can also be mounted on a single arm cover and support whereby it would be more versatile.

Figure 4:
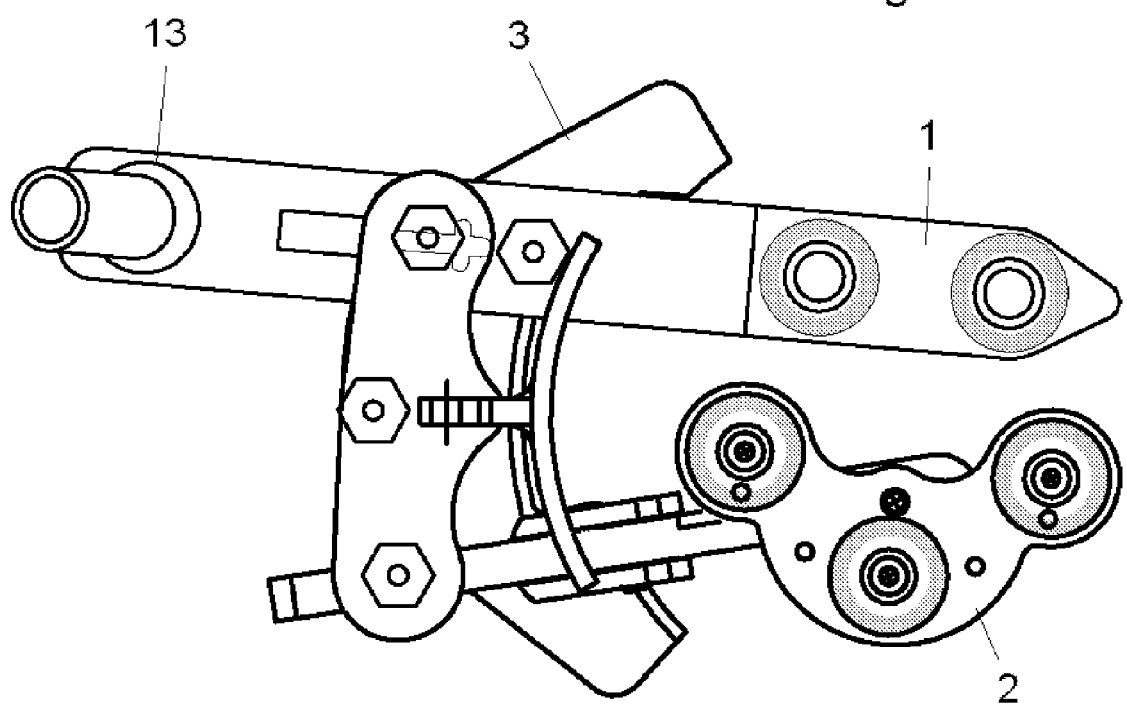

FIGS. 3 and 4 show the operation of the channeled plug. The flow inlet (11) is through two of the five nozzles of the jet pump. The outlet (14) is through the plug (13), which is channeled in this case.

Having sufficiently described the nature of the invention as well as a preferred embodiment, it is hereby stated for all relevant purposes that the materials, shape, size and arrangement of the described elements can be modified providing that this does not involve an alteration of the essential features of the invention which are claimed below.

The invention claimed is:

1. A plug device for jet pumps installed in nuclear power plant vessels, comprising: two covers (1-2) that form two independent plug units, one fitted on the even pump, which incorporates two plugs (6), and the other one on the odd pump of each jet pump assembly, which incorporates three plugs (6), both mounted on a common base (3) at the end of respective arms (4), articulated in a central area, wherein the three plugs (6) located on the nozzles of the odd pump are blind, and the two plugs (6) located on the nozzles of the even pump have respective fluid inlets (11) communicating through a channeled arm (13) towards an outlet (14), enabling fluid circulation during decontamination tasks, whereas three nozzles of the odd pump of each jet pump assembly are sealed; the arms (4) being actuated by mechanical or hydro-pneumatic means, applying the corresponding plug on the nozzles of the jet pump once the base (3) of the plug is supported on a mixer part of the jet pump (10), through a guide (12) centering the plug device therein, and in respective prolongations of the base (3) consisting of a lower reaction (8) serving as support both when introducing the plug in the pump and when demounting same, and in an upper reaction (9) serving to allow the closure of the plug against the nozzles of the jet pump which are located on the plug.

2. The device of claim 1, in which the covers (1) forming each plug unit are mounted in the arm (4) in a pivoting manner on a central point (7), which allows self-alignment of a plane of the plugs (6) with a plane of the nozzles to be blocked.

3. The device of claim 1, in which the covers carrying plugs are attached or are a single cover, incorporating the five plugs (6) in a suitable arrangement and are actuated by means of a single arm (4) and clamping screw (5).

4. The device of claim 1, further comprising an adjusting screw (15) arranged between the arm (4) and the guide (12) at the opening of the mixer of the jet pump which allows assuring a parallelism of a sealing surface of the plug with a plane of the nozzles to be plugged of the jet pump.

* * * * *